(12) United States Patent
Weidner

(10) Patent No.: US 6,205,112 B1
(45) Date of Patent: Mar. 20, 2001

(54) MULTIPURPOSE OPTICAL DISC HAVING DIFFERENT FORMATS ON OPPOSING SIDES

(75) Inventor: Steven Lee Weidner, Elk Point, SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/024,993

(22) Filed: Feb. 17, 1998

(51) Int. Cl.$^7$ ........................................ G11B 7/00

(52) U.S. Cl. ................... 369/275.3; 369/32; 369/94

(58) Field of Search ........................ 369/94, 275.1, 369/275.3, 275.4, 124, 44.29, 44.37, 44.23, 32, 58, 54; 380/4; 371/2.1, 40.14

(56) References Cited

U.S. PATENT DOCUMENTS

| | | | |
|---|---|---|---|
| 4,310,919 | 1/1982 | Slaten | 369/94 |
| 5,533,002 | 7/1996 | Abraham | 369/275.3 |
| 5,540,966 | 7/1996 | Hintz | 369/275.3 |
| 5,579,296 | 11/1996 | Smith et al. | 369/275.1 |
| 5,623,478 | 4/1997 | Horimai | 369/275.4 |
| 5,640,382 | 6/1997 | Florczak et al. | 369/275.3 |
| 5,640,383 | 6/1997 | Kamoto et al. | 369/275.1 |
| 5,732,088 | * 3/1998 | Sako | 371/2.1 |
| 5,793,734 | * 8/1998 | Tsuchiya et al. | 369/112 |
| 5,802,174 | * 9/1998 | Sako et al. | 380/4 |
| 5,828,648 | * 10/1998 | Takasu et al. | 369/275.1 |
| 5,878,018 | * 3/1999 | Moriya et al. | 369/275.1 |
| 5,903,531 | * 5/1999 | Satoh et al. | 369/44.29 |
| 5,933,401 | * 8/1999 | Lee et al. | 369/112 |
| 5,959,946 | * 9/1999 | Tognazzini | 369/32 |

OTHER PUBLICATIONS

Anonymous, "What is DVD?", mpeg.co.uk, Oct. 29, 1997.
Anonymous, "DVD and Microsoft Operating Systems", Nov. 6, 1997.
Misty Roohi, "More than CD . . . Enhanced CD Formats", copyright 1993 by Cinram.
Rich D'Ambrise, "A Closer Look at DVD", Maxwell Corporation of America, http://www.cd–info.com/CDinfo.com/CDIC/Technology/DVD/dvd.html.
Anonymous, "PreMastering in the Age of DVD, A Primer for Creating Content for DVD", Sonic Solutions.
Anonymous, "20 Questions About DVD", *Family PC*, Nov. 1997, pp.134–138.
Clayton Summers, "Introduction to ISO 9660, what it is, how it is implemented, and how it has been extended.", copyright 1993 by Cinram.
Steve Soto, "An Overview to Multimedia CD–ROM Production", copyright 1993 by Cinram.
J. Busk, "Integrating Mixed–Mode CD–ROM", copyright 1993 by Cinram.
J. Busk et al., "Compact Disc Terminology", copyright 1993 by Cinram, second edition.
Anonymous, "MultiRead Specification for CD–ROM, CD–R/RW and DVD–ROM Devices", copyright 1997 by Optical Storage Technology Association, Revision 1.0.
Anonymous, "Overview of CD–ROM Capacity", Cinram/Disc Manufacturing, Oct. 29, 1997.

(List continued on next page.)

*Primary Examiner*—Hoa T. Nguyen
*Assistant Examiner*—Kim-Kwok Chu
(74) *Attorney, Agent, or Firm*—Suiter & Associates PC; William J. Breen, III

(57) ABSTRACT

The present invention teaches an optical storage disc having a first side having at least one data encoded layer, wherein the at least one data encoded area contains a digital asset in at least one format not readable by all conventional optical disc readers or reader/writers, and a second side having at least one data encoded layer, wherein the at least one data encoded area contains a digital asset in at least one format not readable by all conventional optical disc readers or reader/writers.

20 Claims, 5 Drawing Sheets

OTHER PUBLICATIONS

Anonymous, "Plant Tour of How Compact Discs Are Made", Cinram/Disc Manufacturing, Oct. 29, 1997.

Anonymous, "Overview of DVD", Cinram.Disc Manufacturing, Oct. 29, 1997.

Anonymous, "DVD Frequently Asked Questions", Cinram/Disc Manufacturing, Oct. 29, 1997.

Dana Parker, "UDF: When is a Specification a Standard?", The Technology of DVD, Oct. 29, 1997.

Anonymous, "CD Data Input Specifications", Cinram/Disc Manufacturing, Oct. 29, 1997.

Anonymous, "Overview of CD–ROM Encryption, Copy Protection, and Metering", Cinram/Disc Manufacturing, Oct. 29, 1997.

* cited by examiner

MULTIPURPOSE OPTICAL DISC HAVING DIFFERENT FORMATS ON OPPOSING SIDES

TECHNICAL FIELD

The present invention is generally related to optical storage media and more particularly related to an improved optical storage disc capable of storing data in multiple data formats.

BACKGROUND OF THE INVENTION

Digital storage systems are utilized to store digital assets such as video, audio, executable and non-executable computer programs, and data files. These systems generally utilize magnetic or optical media. Some systems, primarily of the magnetic type, are capable of a multiplicity of read/write cycles, while other systems primarily of the optical type, are capable of greater data storage densities but are usually limited to a single write cycle with a multiplicity of read cycles.

Although entities producing digital assets on optically readable discs may do so in a variety of formats, end users commonly have the equipment to read only a subset of the group of available formats. Because each format has an inherent set of available features which may lend the format to a particular type of digital asset, producers must limit themselves to the production of discs (and therefore the content features) having that combination of features required by the content which is most readily readable by the intended end user.

Digital assets are commonly written to 12.0 cm optical discs in one of the following formats:

CD-DA (Compact Disc-Digital Audio)
CD-ROM (Compact Disc-Read Only Memory)
CD-R (Compact Disc-Recordable)
CD-RW (Compact Disc-ReWritable)
"Mixed Mode" CD
Hidden Track (a.k.a. I-Track, ROM Ready, and AUDIOVISION™)
Enhanced Audio Product (a.k.a. SELECTWARE™)
CD+ (a.k.a. Stamped Multisession, and CD Extra)
CD-I Ready (Compact Disc-Interactive)
CD+G (Compact Disc+Graphics)
PHOTO CD
KARAOKE CD
DVD-ROM (Digital Versatile Disc-Read Only Memory)
DVD-Audio (Digital Versatile Disc-Audio)
DVD-Video (Digital Versatile Disc-Video)
DVD-RAM (Digital Versatile Disc-Random Access Memory)
DVD-R (Digital Versatile Disc-Recordable)
Divx-DVD There are of course other formats and reader/writers capable of reading and/or writing in multiple formats. For example, certain DVD players are capable of reading CD-ROM discs in various formats and certain CD drives are capable of reading CD-DA, CD-ROM, CD-RW, CD-R, PHOTO CD, KARAOKE CD, ISO 9660, and HFS Discs.

There are also known to the art standards for recording various formats on a single sided optical disc. For example, the UNIVERSAL DISK FORMA™ (see *Universal Disk Format Specification*, Optical Storage Technology Association OSTA-2 Revision 1.50, Feb. 4, 1997) and Mixed-Mode CD ROM (see *Integrating Mixed-Mode CD-ROM*, CINRAM, J. Busk, Feb. 6, 1992).

Likewise, there are several methods known of recording optical media. For example, Horimai, U.S. Pat. No. 5,623,478 teaches recording a first and second pit string on opposite sides of a track center. Additionally, Slaten, U.S. Pat. No. 4,310,919 teaches a two sided video disc member wherein both sides contain digital information. Further, Hinz, U.S. Pat. No. 5,540,966 teaches a dual layer optical medium utilizing at least one partially reflective layer such that both layers may be read from a single optical storage disc side.

Thus the prior art teaches multi-layer optical discs, dual sided optical discs, multiple data formats, and readers capable of reading multiple formats. However, the prior art does not teach a dual sided optical disc having different formats on opposing sides.

SUMMARY OF THE INVENTION

The present invention teaches an optical disc having at least one data encoded area on each side. An optical disc of the present invention may be configured, in for example, in at least one of the following fashions:

| Side One | Side Two |
|---|---|
| DVD-Video | DVD-Audio |
| DVD-Video | CD-DA |
| DVD-RAM | CD-ROM |
| DVD-Audio | CD-DA |
| KARAOKE-CD | CD-DA |
| KARAOKE-CD | DVD-Audio |
| "Mixed Mode" CD (or MMVF) | CD-DA |
| DVD-Video | PHOTO CD |
| DVD-R | CD-ROM |
| CD-I | DVD-Video |
| Divx-DVD | DVD-Video |

Other combinations of various formats may also be configured such that entities producing digital assets may provide retailers and consumers with a wider range of products which require less shelf space. It is therefore, a primary object of the present invention to provide an improved optical disc. It is a further object of the present invention to provide an optical disc which is capable of at least one of being read by both standard Audio CD drives and computer CD drives, or DVD and Divx-DVD drives, or DVD drives and CD drives, or the like. It is still a further object of the present invention to provide an optical disc which is more economical to retailers in that it allows a greater number of products to be sold with a reduced amount of storage or display space. It is yet a further object of the present invention to provide users with optical discs which are configured to requirements. It is yet still a further object of the present invention to provide an optical disc which is easy to use, manufacture, and economical.

BRIEF DESCRIPTION OF THE DRAWINGS

Embodiments of this invention will now be described, by way of examples only with reference to the accompanying drawings, in which.

DESCRIPTION OF PREFERRED EMBODIMENTS

Figure 4:
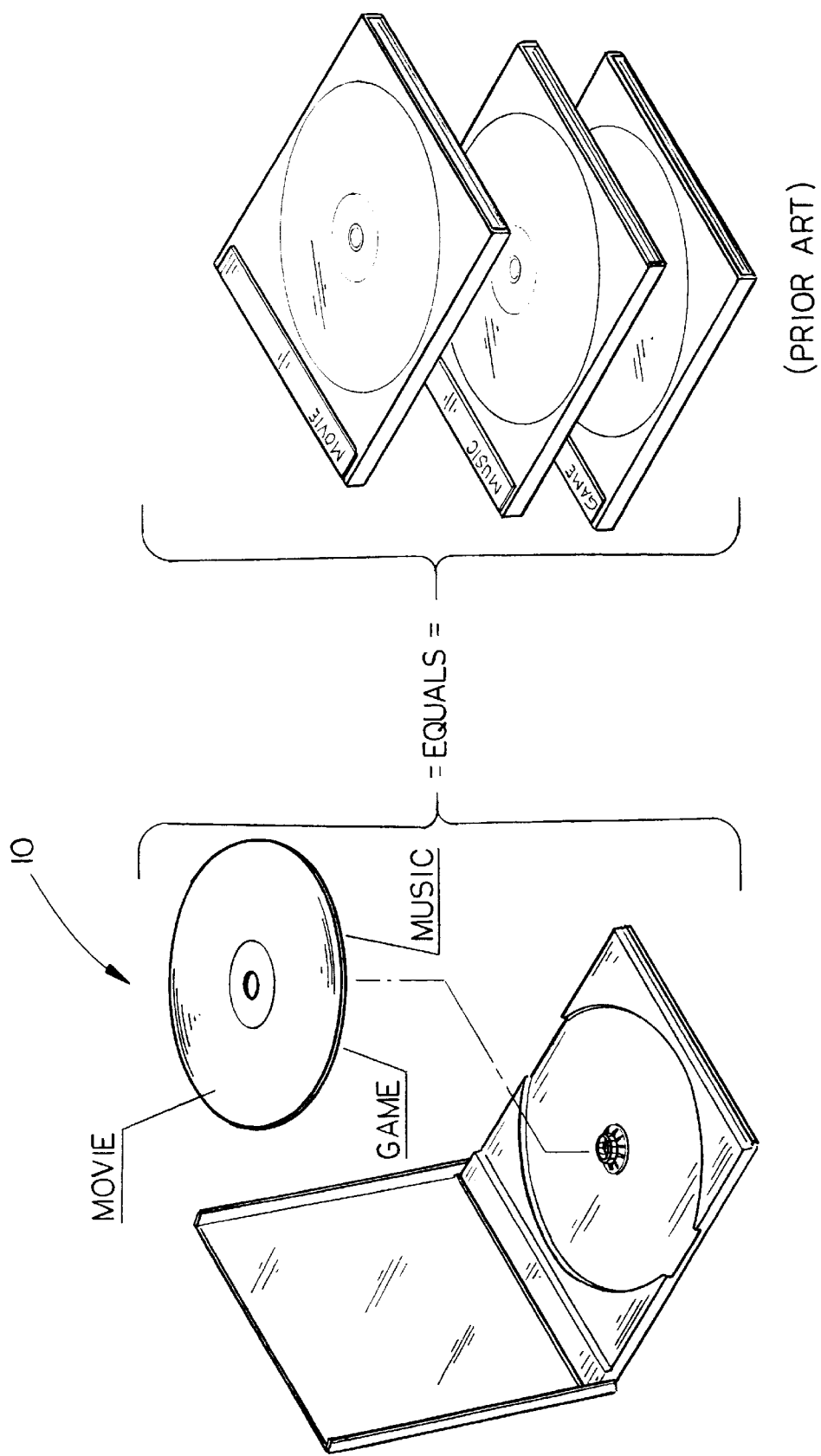
FIG. 4 is a perspective view of optical discs (in jewel cases or carriages) illustrating an exemplary embodiment of the present invention wherein a single optical disc of the present invention could contain a full-length motion picture on a first side, and the movie sound-track (or music videos) and a computer game or the like on a second side.
Figure 5:
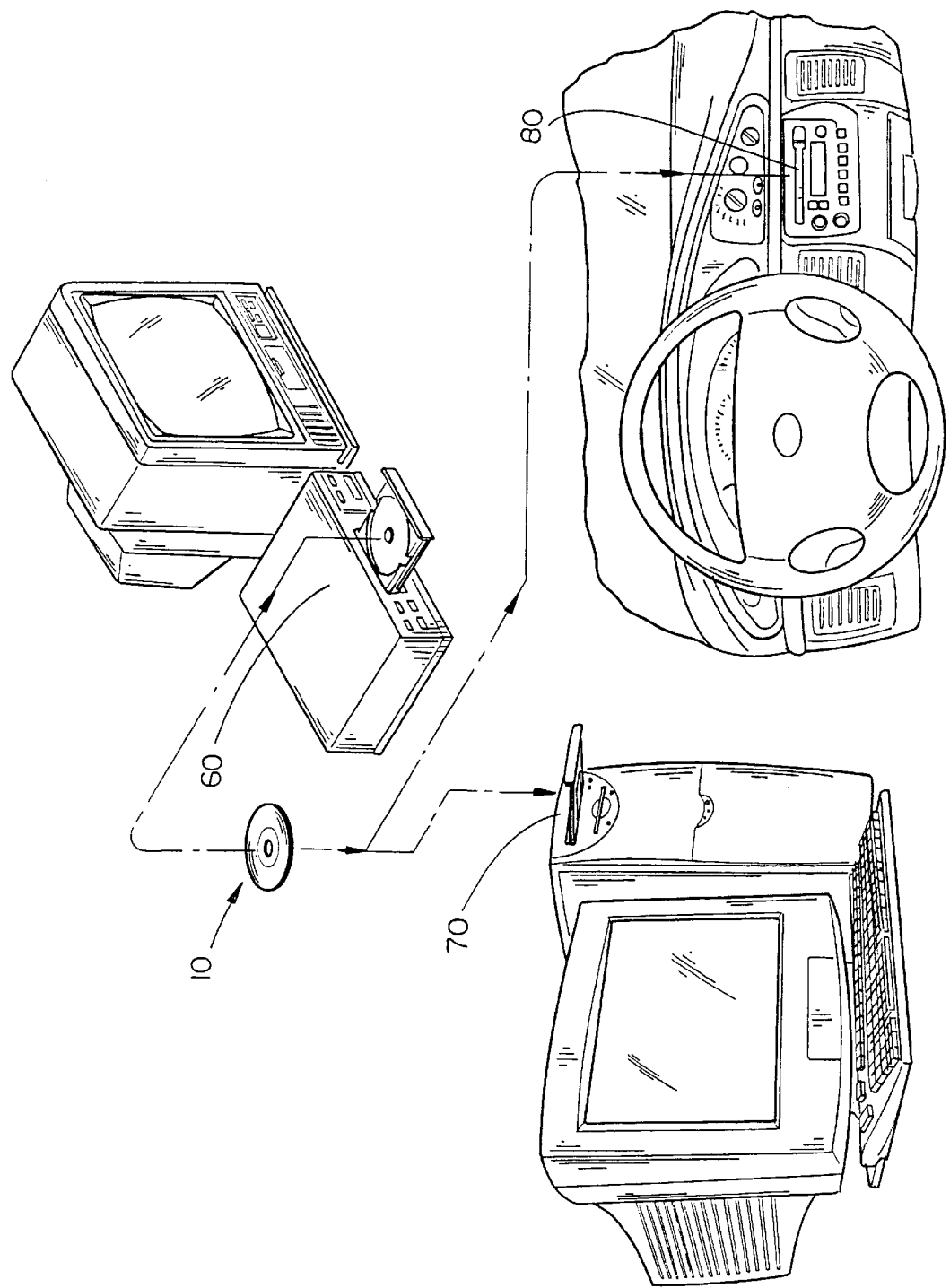
FIG. 5 is a perspective view of an optical disc of an exemplary embodiment of the present invention illustrating how an optical disc of the present invention could be played (read) using the conventional reading equipment currently utilized by most users.

Referring to the drawings, there is shown an optical disc 10 (including 10' and 10") in FIGS. 5 and 2A, 2B, and 2C which has two sides and at least one data encoded area per side. Each of the first and second sides (12 and 14) may contain at least one data encoded layer encoded with data of a particular type, by way of example only, DVD reader type data including certain DVD type formats and/or CD reader type data including certain DVD and CD type formats which are capable of being read by both certain DVD readers and CD readers (FIGS. 4 and 5).

Following are prophetic examples of various exemplary embodiments of the present invention:

A. Full-Length Motion Picture+Music Videos

In this embodiment a first side may contain a full-length motion picture on a first side in, for example, DVD-Video format, and a series of music videos on a second side, in for example DVD-Video format.

B. Full-Length Motion Picture+Full-Length Motion Picture

In this embodiment a first side may contain a first full-length feature motion picture in, for example, a pay-per-view type format such as Divx-DVD, and a second full-length non-feature motion picture in a non-pay-per-view format such as DVD-Video on a second side.

C. Full-Length Motion Picture+Audio

In this embodiment a first side may contain a full-length feature motion picture in for example, a pay-per-view type format such as Divx-DVD or a non-pay-per view type format such as DVD-Video, and a motion picture sound track on a second side in, for example a DVD-Audio or CD-DA format.

D. Full-Length Motion Picture+Catalog

In this embodiment a first side may contain a full-length feature motion picture in for example, a pay-per-view type format such as Divx-DVD or a non-pay-per view type format such as DVD-Video, and a catalog of movie previews or catalog and the like on a second side in, for example in a CD-ROM format or the like.

E. Full-Length Motion Picture+Computer Game

In this embodiment a first side may contain a full-length feature motion picture in for example, a pay-per-view type format such as Divx-DVD or a non-pay-per view type format such as DVD-Video, and a computer game (based on the movie or the like) on a second side in, for example, a CD-ROM, CD-I, or the like format.

F. Full-Length Motion Picture+Karaoke

In this embodiment a first side may contain a full-length feature motion picture in for example, a pay-per-view type format such as Divx-DVD or a non-pay-per view type format such as DVD-Video, and Karaoke on a second side in, for example, a KARAOKE CD format.

G. Full-Length Motion Picture+Still Photos

In this embodiment a first side may contain a full-length feature motion picture in for example, a pay-per-view type format such as Divx-DVD or a non-pay-per view type format such as DVD-Video, and still photos (from the motion picture or related photos and the like) on a second side in, for example, a PHOTO CD, CD-ROM, "Mixed Mode" CD, or the like.

H. Full-Length Motion Picture+Audio+Computer Game

In this embodiment a first side may contain a full-length feature motion picture in for example, a pay-per-view type format such as Divx-DVD or a non-pay-per view type format such as DVD-Video, and the movie sound track (or the like) and a computer game (based on the movie or the like) on a second side in, for example, a CD-ROM, "Mixed-Mode" CD, DVD-RAM, or the like format.

I. Music Videos+Audio

In this embodiment a first side may contain music videos in for example, a pay-per-view type format such as Divx-DVD or a non-pay-per view type format such as DVD-Video, and the audio (from the music videos or the like) in, for example, DVD-Audio, CD-DA, or the like format on the second side.

J. Audio+Computer Game

In this embodiment a first side may contain audio such as (instructional audio or music) in, for example, a DVD-Audio, CD-DA, or the like, and a second side may contain a computer game in, for example, a CD-ROM, DVD-RAM, or like format.

K. Computer Program+Computer Program Data (Read/Write)

In this embodiment a first side may contain a computer program (word-processor, spread-sheet, accounting package, operating system, or the like, and a second side may contain data produced, for example by a user utilizing said program on said first side on a second side in, for example, a CD-R, CD-RW, DVD-RAM, or the like format.

L. Computer Data (Read)+Computer Program Data (Read/Write)

In this embodiment a first side may contain computer data (zip-code directory, telephone directory, maps, or the like) in, for example, a read only format such as CD-ROM or the like, and a second side may contain related data in a read/write format.

M. Audio+Karaoke

In this embodiment a first side may contain audio and a second side may contain Karaoke video/audio.

N. Interactive Movie/Video Game+Video Game

In this embodiment a first side may contain an interactive movie video in, for example, a DVD type format, and a second side may contain a video game in, for example a CD-ROM or CD based game player format.

Figure 1:
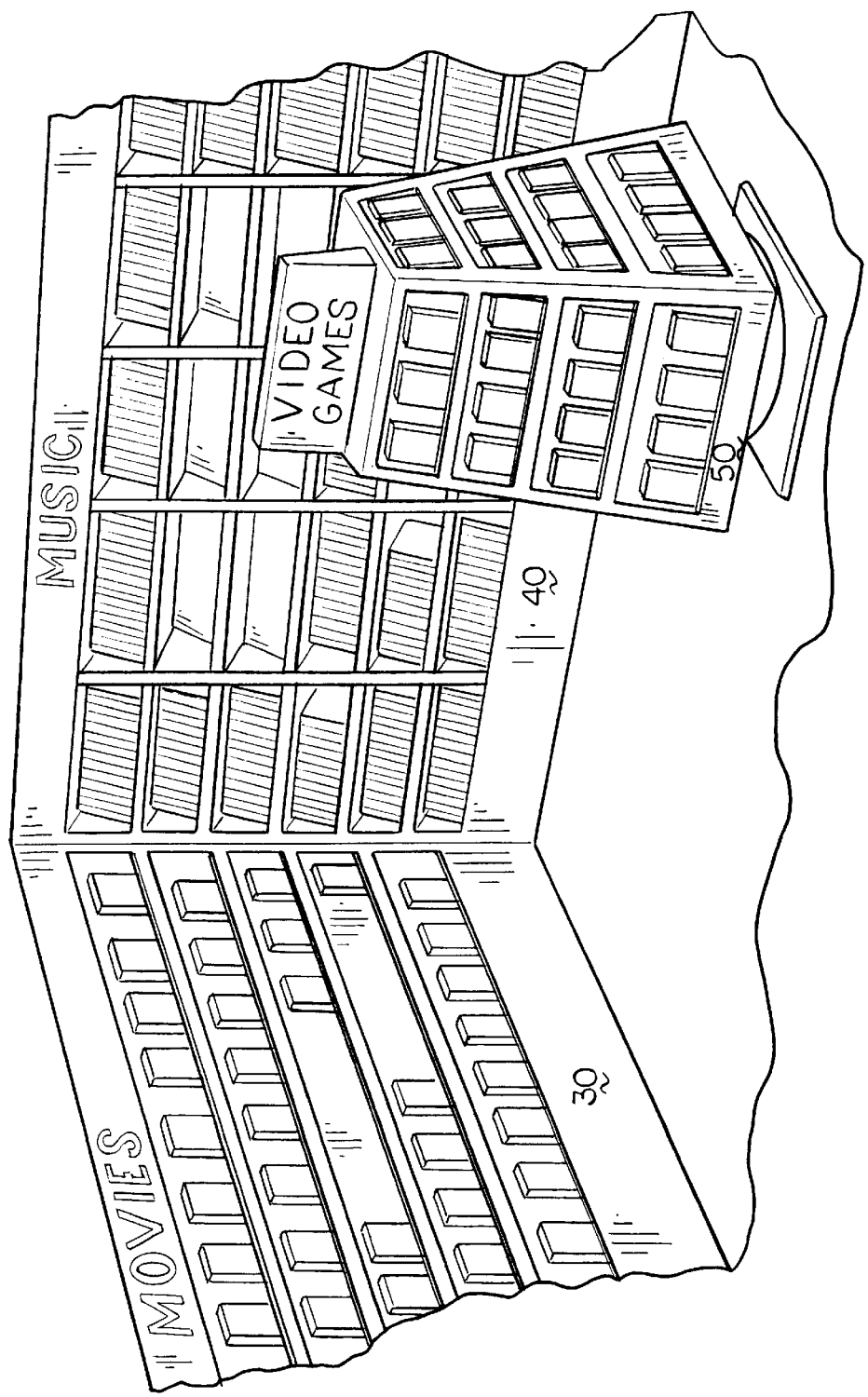
FIG. 1 is a perspective view of a prior art retail display of optical discs showing the current requirement of having a large display area for various type of optical discs.
Figure 2A:
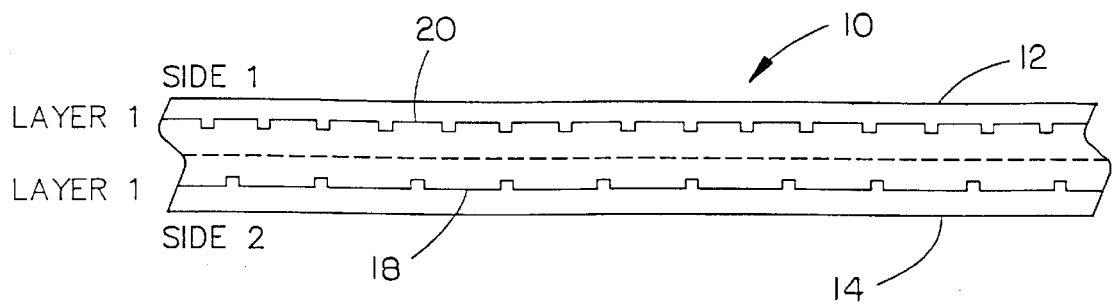
FIG. 2A is a highly diagrammatic side elevation of dual layer optical disc having a single data encoded layers on each side.
Figure 2B:
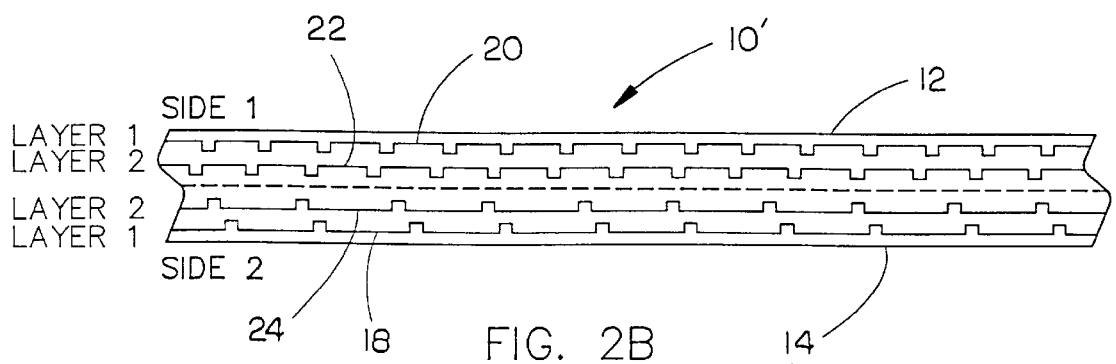
FIG. 2B is a highly diagrammatic side elevation of a dual layer optical disc having two data encoded layers on each side.
Figure 2C:
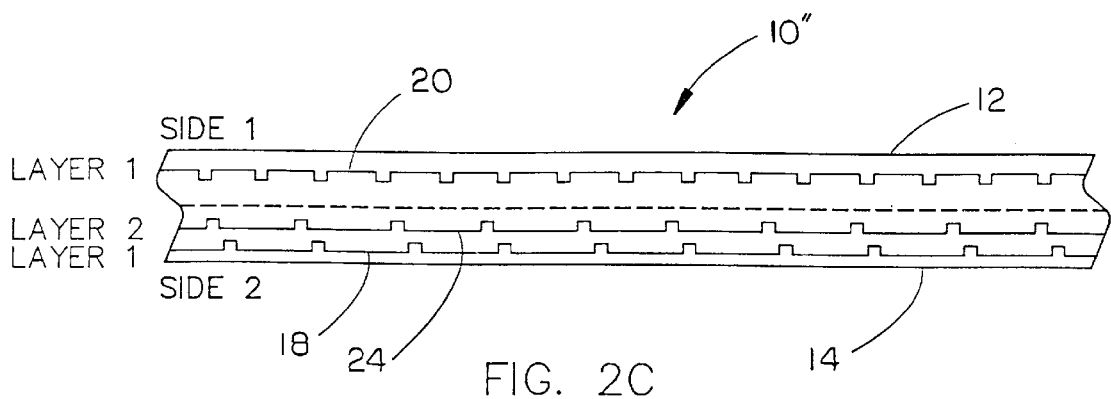
FIG. 2C is a highly diagrammatic side elevation of a dual layer optical disc having a single data encoded layer on a first side and two data encoded layers on a second side.
Figure 3:
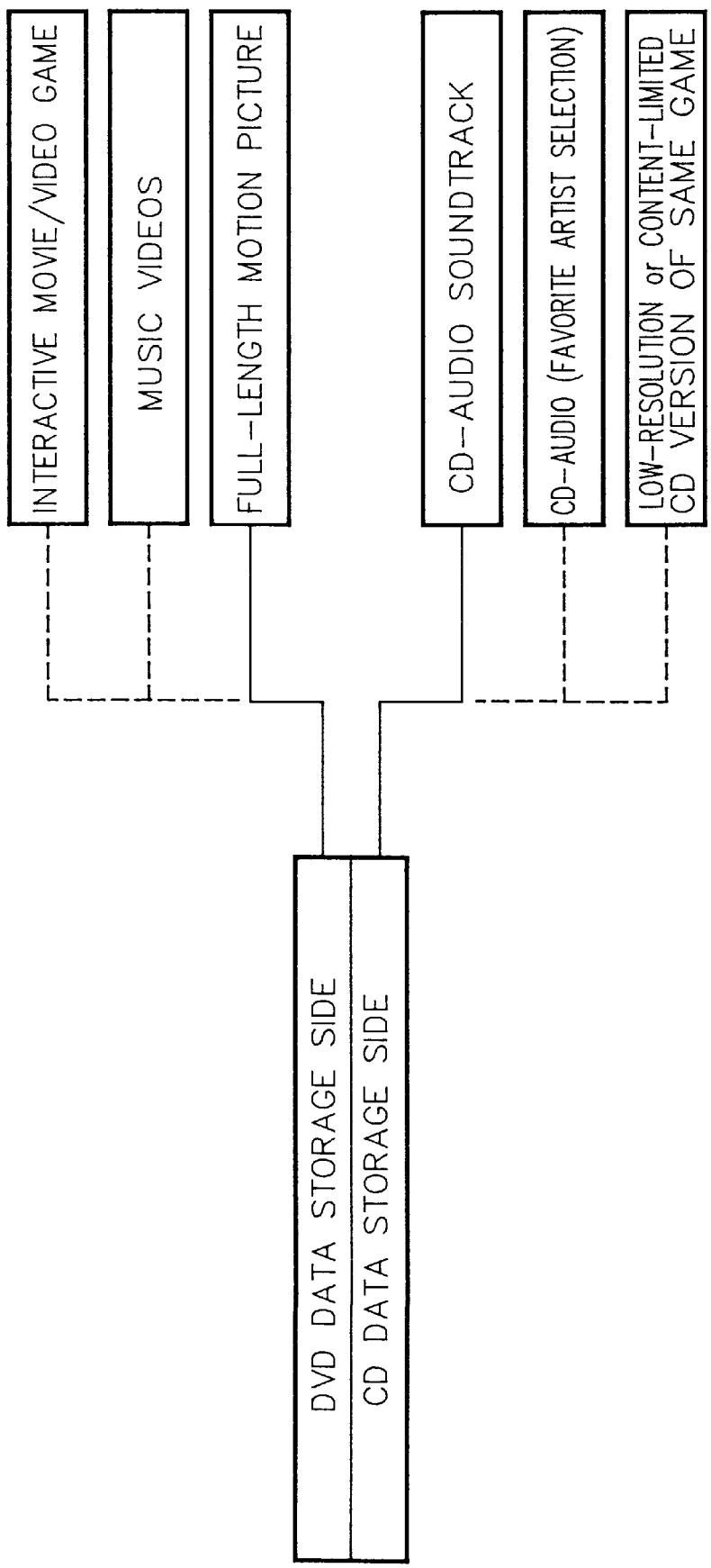
FIG. 3 is a block diagram illustrating exemplary embodiments of a few potential configurations of an optical disc of the present invention.

It should be appreciated that a retail store (FIG. 1) having displays of, for example, computer software 50, music 40, and movies 30, may reduce the size (or increase the number of offerings) with the present invention. By way of example only, these three displays could be integrated into a single display area.

Likewise, it will be appreciated that a consumer may, by way of example only, purchase a single optical disc 10 (also 10', and 10") being capable of use in an automobile CD player 80, a computer CD or DVD type drive 70, or a home entertainment center player 60 or the like.

Thus, there has been described an optical disc providing at least all of the stated objects of the present invention. It will be apparent to the skilled practitioner other uses and combinations of formats may be utilized to meet other useful and commercial objects not stated or set forth herein, but which are still within the scope of the appended claims.

What is claimed is:

1. An optical disc, comprising:
   (a) a first side having at least one data encoded layer, said at least one data encoded area containing a digital asset in at least one format, said at least one format not readable by more than two of a DVD type reader, a DVD type reader/writer, a Divx-DVD type reader, a computer CD type reader, a computer CD type reader/writer, a CD audio player, a CD audio player/recorder, and a CD based game player; and
   (b) a second side having at least one data encoded layer, said at least one data encoded area containing a digital asset in at least one format, said at least one format not readable by more than two of a DVD type reader, a DVD type reader/writer, a Divx-DVD type reader, a computer CD type reader, a computer CD type reader/writer, a CD audio player, a CD audio player/recorder, and a CD based game player wherein said first side having at least one data encoded layer and said second side having at least one data encoded layer are in different formats readable by at least two different types of readers wherein the first data format and the second data format are different so as to enable the first data format to be read on a first reader, the first reader being incapable of reading the second data format.

2. The optical disc of claim 1, wherein a first one of said at least two layers is readable by a DVD type reader and a second one of said at least two layers is readable by a CD type reader.

3. The optical disc of claim 1, wherein a first one of said at least two layers is in a pay-per-view format and a second one of said at least two layers is in a non-pay-per view format.

4. The optical disc of claim 1, wherein a first one of said at least two layers is in read only format and a second one of said at least two layers is in a read/write format.

5. The optical disc of claim 1, wherein a first of said two sides is in a read only format and a second of said two sides is in a read/write format.

6. The optical disc of claim 1, wherein a first one of said two sides is in a pay-per-view format and said second side has a layer in a non-pay-per view format.

7. The optical disc of claim 6, wherein said pay-per-view format is an interactive game.

8. A process for manufacturing a multipurpose optical disc, comprising:
   (a) encoding a first data encodable layer in a first data encoded region on a first side of an optical disc in a first data format; and
   (b) encoding a second data encoded region on a second side of the optical disc in a second data format wherein the second data format and the first data format are different so as to enable the first data format to be read on a first reader, the first reader being incapable of reading the second data format.

9. The process of claim 8, further comprising:
   (c) encoding a third data encodable layer in a third data encoded region on the first side of an optical disc in a third data format wherein the third data format and the first data format are different.

10. The process of claim 9, further comprising:
    (d) encoding a fourth data encodable layer in a fourth data encoded region on a second side of an optical disc in a fourth data format wherein the fourth data format and the second data format are different.

11. The process of claim 10, wherein the first data format is readable by a DVD player and the second data format is readable by a CD type reader.

12. The process of claim 10, wherein the first format and the second format are different so as to enable the first side to be read by a first reader, the first reader capable of reading the first format but not the second format.

13. An optical disc, comprising:
    (a) a first side having a first data encoded region in a first format; and
    (b) a second side having a second data encoded region in a second format wherein the first data format and the second data format are different so as to enable the first data format to be read on a first reader, the first reader being incapable of reading the second data format.

14. The optical disc of claim 13, wherein the first data encoded region is included on a first layer and the second data encoded region is included on a second layer.

15. The optical disc of claim 13, further comprising:
    (c) a third data encoded region in a third format on the first side.

16. The optical disc of claim 15, wherein the first data encoded region is included on a first layer and the third data encoded region is included on a third layer, the first layer and the third layer are disposed on the first side of the disc.

17. The optical disc of claim 15, wherein the first data encoded region and the third data encoded region is included on a first layer.

18. The optical disc of claim 13, wherein the first format is in a read only format and the second format is in a read/write format.

19. The optical disc of claim 13, wherein the first format is in a pay-per-view format and the second format is in a non-pay-per view format.

20. The optical disc of claim 13, wherein the first data format is readable by a DVD player and the second data format is readable by a CD type reader.

\* \* \* \* \*